UNITED STATES PATENT OFFICE.

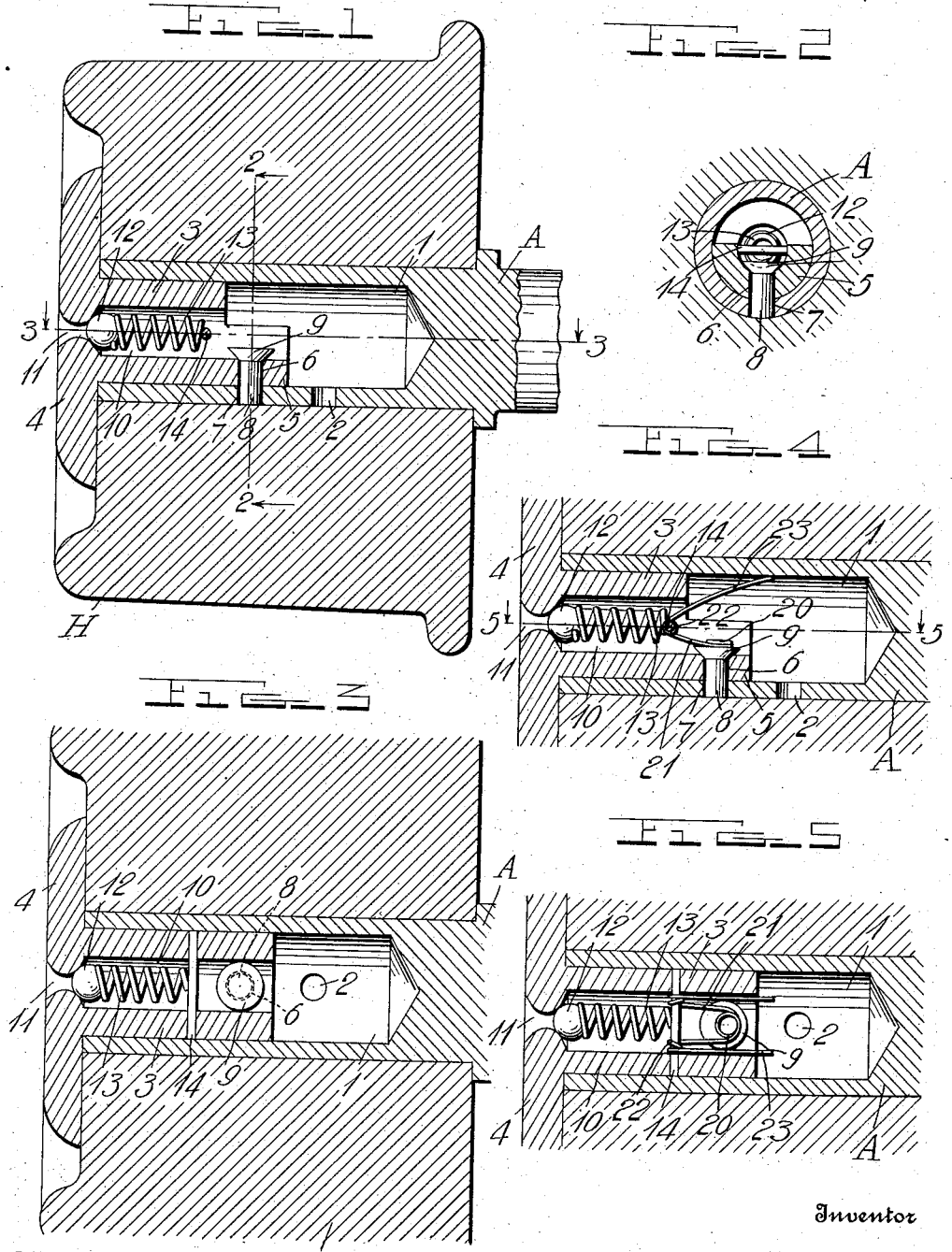

THOMAS HAULTON, OF BELLE VERNON, PENNSYLVANIA.

HUB-ATTACHER.

1,047,805. Specification of Letters Patent. Patented Dec. 17, 1912.

Application filed August 16, 1912. Serial No. 715,422.

*To all whom it may concern:*

Be it known that I, THOMAS HAULTON, a citizen of the United States, residing at Belle Vernon, in the county of Fayette and State of Pennsylvania, have invented certain new and useful Improvements in Hub-Attachers; and I do declare the following to be a full, clear, and exact description of the invention, such as will enable others skilled in the art to which it appertains to make and use the same.

This invention relates to the class of carriages and wagons, and more especially to hub attaching devices; and the objects of the same are to produce improved means whereby the hub may be attached to or detached from the spindle of the axle at will and without the use of tools, and improved means for oiling the interior of said hub automatically. These and other objects are carried out by constructing the device in the manner hereinafter more fully described and claimed, and as shown in the drawings, wherein—

Figure 1 is a vertical section through a hub and this attacher with its parts complete, and Fig. 2 is a cross section on the line 2—2 of Fig. 1. Fig. 3 is a horizontal section through the hub and attacher, taken on about the line 3—3 of Fig. 1; Fig. 4 is a vertical section of a slight modification, and Fig. 5 is a horizontal section on the line 5—5 of Fig. 4.

In the drawings the letter A designates the axle or it may be the spindle only of the axle, and ordinarily this member does not rotate although in some cases it may rotate and yet be used in connection with my invention; and the letter H in the present instance designates a wheel or roller, or it may be the hub of such a wheel or roller whose interior it is desired to lubricate around the axle or spindle therein. Also it is the purpose of the present invention to provide improved means for mounting the member H removably on the member A without employing the usual nut screwed upon or cotter pin passed through the outer extremity of the spindle, and without the necessity for any member which shall project beyond the outer end of the wheel or hub to strike against passing objects or to be struck by them.

Coming now more particularly to the details of the present invention, the axle A is bored in its end with a preferably cylindrical and internally smooth cavity forming an oil reservoir 1, and the lower side of the axle is cross-bored with an outlet hole 2 communicating with the cavity or reservoir 1 near the inner end of the latter. During the rotation around the axle spindle of the hub (or the bushing within the same if it have a bushing) it is obvious that oil flowing out the hole 2 will be immediately applied to the point where friction would otherwise occur, but as this hole is surrounded by the hub no dirt can get into it and what sediment exists in the oil will settle to the bottom.

For attaching the hub to the spindle I make use of a plug 3 having a large flat head 4 intended to stand against the outer end of the hub as shown, and the inner end of the plug at one side is continued or projected into a tongue 5 pierced with a hole 6 adapted to register with another hole 7 in the lower wall of the reservoir, but this hole 7 is not the same as the hole 2 and is by preference drilled at a point nearer the extremity of the axle than said outlet hole 2 for the oil. A gravity pin 8 having a slightly enlarged head 9 at its inner end is seated in the holes 6 and 7, which aline when the washer or head 4 at the outer end of the plug stands against the extremity of the spindle and holds the wheel H in place, and at this time the plug closes the outer end of the reservoir 1 as will be clear.

To connect the parts, the tip of the gravity pin is passed into the inner end of the hole 6, and the inner end of the plug 3 passed into the outer end of the reservoir or bore 1 in the axle, the tip of the finger holding said pin 8 elevated until it is passed into said bore and is held elevated by the lower wall thereof. The plug is then pushed inward until the hole 6 and gravity pin 8 stand over the hole 7 through the lower wall of the reservoir, when the pin falls by gravity and the parts are connected as shown in Fig. 1 of the drawings. To disconnect the parts the vehicle carrying the axle A must be inverted, and this permits the pin 8 by its weight to fall into the reservoir 1 so that its tip clears the hole 7 and possibly also falls out of the hole 6; after which the entire plug can be withdrawn, and then the wheel H removed. In the act of cleaning out the reservoir, the pin will be found therein.

I have suggested above that it might be that the axle revolves. For instance, this device might be applied to the supporting shaft of an elevator bucket, which shaft stands one side up as the bucket ascends and is inverted as the bucket descends; and in the event thereof the pin might drop out of place. Accordingly, means must then be provided to sustain the pin even when the shaft rotates or is inverted occasionally, and a detail of construction effecting this purpose is illustrated in Fig. 5 of the drawings. This consists of a spring made of light steel wire as will be described below, although the particular formation and attachment of this spring will depend upon other details of construction as will be seen from what follows. The broad idea is, however, that the light spring is to hold the gravity pin to its place with force sufficient to prevent its tip from slipping out of the hole 7 when the axle is inverted or when it revolves, unless the entire wheel and hub be thumped or pounded with sufficient force to jiggle the pin inward against the force of this spring.

Any suitable means may be provided for filling the reservoir 1 with oil, but in order that the attaching device shall not necessarily have to be withdrawn for the purpose of filling the reservoir, I may make use of the following details of construction: The plug 3 as shown in the drawings is a tubular plug, its bore 10 opening through the washer or head 4 in a reduced filling orifice 11 normally closed by a ball 12 pressed to its seat by a coiled spring 13 standing within said bore with its other end against a cross pin 14. When the plug is thus made, what would normally be its lower side is continued into the tongue 5 above described, which tongue is pierced with a radial hole 6 for the passage of the gravity pin 8, and the latter moves across the inner end of the plug when the axle is inverted as described. In order to fill the oil reservoir it is only necessary to insert the tip of an oil can or a filling can into the orifice 11 and press the ball 12 away from the same, then inject the oil which flows into the oil reservoir 1, and remove the tip of the can. The seating of the ball against the inner side of the orifice 11 normally closes the reservoir so that dust and dirt may not get into the same nor oil escape excepting through the outlet hole 2 as is desired. I wish it understood, however, that this is only one of many expedients which may be resorted to for the purpose of filling the reservoir with oil, but I consider it particularly serviceable in this connection, and simple and inexpensive.

A slight modification or amplification of this invention is illustrated in Fig. 4 and referred to above, and this when used in connection with the cross pin 14 and gravity pin 8 is a piece of spring wire bent into a flat coil 20 at its center to rest on the head 9 of said gravity pin 8, thence into parallel arms 21, and the two arms into alined coils 22 loosely embracing the pin 14, and the ends of the spring thence continued in straight lines as at 23 adapted to rest inside the bore of the plug or within the bore of the reservoir and hold the entire spring in a normally horizontal plane. When this attachment is applied to the device above described, the pin 8 is held in place not only by its gravity but also by the downward pressure of the flat coil 20 upon its head, and therefore, the material of which this spring is composed should be so light that when the axle is inverted it is possible to unseat the gravity pin by thumping on the wheel. I do not wish to be limited to the details of construction further than as necessary to carry out the spirit of this invention. Also I wish it to be understood that the hub attaching device may be employed without necessarily using all the details of the lubricator, or the reverse; but I prefer to employ both features of this invention because they coact to produce a desirable and successful whole.

What is claimed as new is:—

1. In a hub attaching device, the combination with an axle having a socket in its extremity and a hole leading downward from said socket; of a plug adapted to fit said socket and having a head at its outer end and a tongue at its inner end pierced with a hole adapted to aline with that in the axle, and a gravity pin in said alined holes.

2. In a hub attaching device, the combination with an axle having a socket in its extremity and a hole leading downward from said socket; of a plug adapted to fit said socket and having a head at its outer end and a tongue at its inner end pierced with a hole adapted to aline with that in the axle, and a pin in said alined holes having a head at its inner end larger than the hole through said tongue.

3. In a hub attaching device, the combination with an axle having a socket in its extremity and a hole leading downward from said socket; of a plug adapted to fit said socket and having a head at its outer end and a tongue at its inner end pierced with a hole adapted to aline with that in the axle, a pin in said alined holes having a head at its inner end larger than the hole through said tongue, and a spring pressing said pin normally outward with gentle force capable of being overcome by inverting the axle and tapping on the hub.

4. In a hub attaching device, the combination with a tubular axle having a hole extending from its bore through its lower wall; of a tubular plug adapted to fit the bore of the axle and having an enlarged head at its outer end and a projecting tongue at its inner end pierced with a hole adapted to aline with that in the wall of the axle when the head stands against the outer end of the axle, and a gravity pin mounted in said alined holes.

5. In a hub attaching device, the combination with a tubular axle having a hole extending from its bore through its lower wall; of a tubular plug adapted to fit the bore of the axle and having an enlarged head at its outer end and a projecting tongue at its inner end pierced with a hole adapted to aline with that in the wall of the axle when the head stands against the outer end of the axle, a pin mounted in said alined holes, a pin across the bore of the plug, and a light spring engaging said cross pin and the inner end of the other pin and bearing the latter radially outward with yielding force capable of being overcome by inverting the axle and tapping the hub.

6. In a lubricating axle, the combination with the spindle having an oil reservoir in its end and an outlet hole leading from the bottom of said reservoir through the lower wall of the axle, said wall being pierced with another hole nearer the extremity of the axle than the outlet hole; of a tubular plug adapted to slide into said reservoir and having a head at its outer end and a projection at the lower side of its inner end pierced with a hole adapted to aline with the outermost hole in the spindle when the head stands against the outer end of the axle, a pin removably fitting said alined holes and having a head at its inner end larger than the hole in said projection, and a light spring pressing said head radially outward with yielding force capable of being overcome by inverting the axle and tapping the hub.

7. In a lubricating axle, the combination with the spindle having an oil reservoir opening at its outer end and a radial outlet therefrom, the wall of said reservoir being pierced with a hole between said outer end and outlet; of a tubular plug adapted to fit the outer end of said reservoir and having the outer end of its bore reduced and a radial hole in its inner end adapted to aline with that in the spindle, a pin removably seated in said alined holes, a ball in the bore of the plug, and a spring pressing said ball against the reduced outer end of such bore, for the purpose set forth.

In testimony whereof I have hereunto set my hand in presence of two subscribing witnesses.

THOS. HAULTON.

Witnesses:
M. M. BURNETT,
R. R. STRAUB.

---

Copies of this patent may be obtained for five cents each, by addressing the "Commissioner of Patents, Washington, D. C."